US012809219B2

(12) United States Patent
Kong

(10) Patent No.: US 12,809,219 B2
(45) Date of Patent: Nov. 24, 2026

(54) DISPLAY DEVICE

(71) Applicant: SUZHOU CHINA STAR OPTOELECTRONICS TECHNOLOGY CO., LTD., Suzhou (CN)

(72) Inventor: Weixing Kong, Suzhou (CN)

(73) Assignee: SUZHOU CHINA STAR OPTOELECTRONICS TECHNOLOGY CO., LTD., Suzhou (CN)

( * ) Notice: Subject to any disclaimer, the term of this patent is extended or adjusted under 35 U.S.C. 154(b) by 191 days.

(21) Appl. No.: 18/931,077

(22) Filed: Oct. 30, 2024

(65) Prior Publication Data

US 2025/0053051 A1 Feb. 13, 2025

Related U.S. Application Data

(63) Continuation of application No. 17/759,794, filed as application No. PCT/CN2022/105509 on Jul. 13, 2022, now Pat. No. 12,158,678.

(30) Foreign Application Priority Data

Jun. 30, 2022 (CN) ........................ 202210778897.5

(51) Int. Cl.
*G02F 1/1362* (2006.01)
*G02F 1/1345* (2006.01)

(52) U.S. Cl.
CPC .... *G02F 1/136286* (2013.01); *G02F 1/13452* (2013.01)

(58) Field of Classification Search
CPC ........... G02F 1/136286; G02F 1/13452; G02F 1/1345; G09G 3/36; G09G 2320/0209; G09G 2320/0257; Y02D 10/00
See application file for complete search history.

(56) References Cited

U.S. PATENT DOCUMENTS

2022/0172692 A1* 6/2022 Wang .................. G09G 3/3696
2023/0298500 A1* 9/2023 Qing .................... G09G 3/3266
345/213

FOREIGN PATENT DOCUMENTS

CN 107203080 A * 9/2017 ......... G02F 1/13306
CN 107870494 A * 4/2018 ......... G02F 1/13452
CN 109143701 A * 1/2019 ......... G02F 1/13452
CN 114446240 A * 5/2022 ............... G09G 3/32

* cited by examiner

*Primary Examiner* — Kevin Quarterman
(74) *Attorney, Agent, or Firm* — PV IP PC; Wei Te Chung

(57) ABSTRACT

The present application discloses a display device, and the display device includes a first substrate and an output adjustable circuit. In the first substrate, a first signal transmitting line extends from a bonding area towards a direction away from the bonding area; a second signal transmitting line is located on a side of a display area close to the bonding area; the output adjustable circuit is respectively connected with the first signal transmitting line and the second signal transmitting line to output a first voltage signal to the first signal transmitting line and output a second voltage signal to the second signal transmitting line according to an initial voltage signal.

20 Claims, 4 Drawing Sheets

| connection scheme | resistance in series and parallel/ Ω | | | output voltage |
|---|---|---|---|---|
| | R1 | R2 | R3 | |
| 1 | × | 0 | 0 | V2=V1=V0 |
| 2 | >0 | × | 0 | V0=V1>v2 |
| 3 | >0 | 0 | × | V0=V2>v1 |
| 4 | × | >0 | >0 | V0>V1 , V0>V2 |

DISPLAY DEVICE

CROSS-REFERENCE TO RELATED APPLICATIONS

This application is a continuation application of U.S. patent application Ser. No. 17/759,794, filed on Jul. 29, 2022, which is a US national phase application based upon an International Application PCT/CN2022/105509, filed on Jul. 13, 2022, which claims priority of Chinese Patent Application No. 202210778897.5 filed on Jun. 30, 2022. The disclosures of the aforementioned applications are incorporated herein by reference in their entireties.

FIELD OF INVENTION

The present application relates to a field of display technology, in particular, to a display device.

DESCRIPTION OF PRIOR ART

With a continuous development of panel industry, display devices with larger sizes and higher refresh rates are increasingly favored by consumers. However, as the size increases, manufacturing difficulties of panels increase, and attenuation of signal transmission will also be greater. When a transmitting line is long, an amplitude and duty of a signal will be seriously distorted. Therefore, when an external device inputs an initial voltage signal (such as a common voltage signal) to a display panel through a bonding area, a voltage value of the initial voltage signal received by an area near the bonding area and a voltage value of the initial voltage signal received by an area away from the bonding area of the display panel are different, that is, distribution of the initial voltage signal located in different areas of a display device is inconsistent.

SUMMARY

The present application provides a display device to solve a technical problem of inconsistent initial voltage signal distribution in different areas of a display device in the prior art.

The present application provides a display device, comprising:

a first substrate, the first substrate comprising a display area and a non-display area arranged around the display area, wherein the non-display area is provided with a bonding area, and the first substrate comprises a first signal transmitting line and at least one second signal transmitting line both located in the non-display area; the first signal transmitting line extends from the bonding area towards a direction away from the bonding area; the second signal transmitting line is arranged on a side of the display area close to the bonding area; and at least one output adjustable circuit, the output adjustable circuit comprising an input end, a first output end, and a second output end, wherein the input end receives an initial voltage signal, the first output end is connected to the first signal transmitting line, and the second output end is connected to the second signal transmitting line; and the output adjustable circuit is configured to output a first voltage signal to the first signal transmitting line and output a second voltage signal to the second signal transmitting line according to the initial voltage signal.

Optionally, in some embodiments of the present application, any two of the input end, the first output end, and the second output end are open circuited or provided with a resistor with a corresponding resistance value.

Optionally, in some embodiments of the present application, a first resistor is arranged between the first output end and the second output end, a second resistor is arranged between the input end and the second output end, and the input end and the first output end are open circuited; a resistance value of the second resistor is zero, and a resistance value of the first resistor is greater than zero.

Optionally, in some embodiments of the present application, a first resistor is arranged between the first output end and the second output end, a third resistor is arranged between the input end and the first output end, and the input end and the second output end are open circuited; a resistance value of the first resistor is greater than zero, and a resistance value of the third resistor is zero.

Optionally, in some embodiments of the present application, the first output end and the second output end are open circuited, a second resistor is arranged between the input end and the second output end, a third resistor is arranged between the input end and the first output end, and resistance values of the second resistor and the third resistor are both greater than zero.

Optionally, in some embodiments of the present application, the display device further comprises a connecting line, and the display device comprises a plurality of second signal transmitting lines; and wherein the connecting line extends along a first direction, and the plurality of second signal transmitting lines are spaced along the first direction and extend to an outside of the first substrate along a second direction; an end of each of the second signal transmitting lines away from the bonding area is connected to the connecting line, an end of the connecting line is connected to the second output end, and the first direction intersects with the second direction.

Optionally, in some embodiments of the present application, the display area comprises a first side and a second side arranged opposite to each other, and a third side and a fourth side arranged opposite to each other, the bonding area is located at the first side, and the first signal transmitting line is arranged at least along the third side, the second side, and the fourth side; and wherein along the first direction, the connecting line comprises a first end and a second end arranged opposite to each other, the display device comprises two output adjustable circuits, and one of the two output adjustable circuits is connected to the first end and an end of the first signal transmitting line close to the first end, respectively; another one of the two output adjustable circuits is connected to the second end and an end of the first signal transmitting line close to the second end, respectively.

Optionally, in some embodiments of the present application, the first signal transmitting line comprises a first line segment, a second line segment, and a third line segment connecting the first line segment and the second line segment; the first line segment and the second line segment are both located on the side of the display area close to the bonding area, and the third line segment is arranged along the third side, the second side, and the fourth side; and wherein a resistance value of the first line segment is greater than a resistance value of at least one of the second signal transmitting lines arranged close to the first line segment, and a resistance value of the second line segment is greater than a resistance value of at least one of the second signal transmitting lines arranged close to the second line segment.

Optionally, in some embodiments of the present application, one of the second signal transmitting lines arranged close to a first line segment comprises at least two sub-transmitting lines arranged in parallel.

Optionally, in some embodiments of the present application, the display device comprises three output adjustable circuits, and a first one of the three output adjustable circuits is connected to the first end and the end of the first signal transmitting line close to the first end, respectively; a second one of the three output adjustable circuits is connected to the second end and the end of the first signal transmitting line close to the second end, respectively; and a third one of the three output adjustable circuits is arranged between the first end and the second end.

Optionally, in some embodiments of the present application, the two output adjustable circuits are same.

Optionally, in some embodiments of the present application, the display device further comprises a circuit board, the circuit board is connected to the bonding area, and the output adjustable circuit and the connecting line are both arranged on the circuit board.

Optionally, in some embodiments of the present application, the initial voltage signal is a common voltage signal, and the first signal transmitting line and the second signal transmitting line are both common voltage transmitting lines.

Optionally, in some embodiments of the present application, the display device further comprises a circuit board, the circuit board is connected to the bonding area, and the output adjustable circuit is arranged on the circuit board.

Optionally, in some embodiments of the present application, the display device further comprises a second substrate and a conductor, the second substrate is arranged opposite to the first substrate, and the conductor is arranged between the first substrate and the second substrate and is located in the non-display area; and wherein the second substrate comprises a common electrode, and the common electrode is connected to the first signal transmitting line and the second signal transmitting line through the conductor.

The present application further provides a display device, comprising:

a first substrate, the first substrate comprising a display area and a non-display area arranged around the display area, wherein the non-display area is provided with a bonding area, and the first substrate comprises a first signal transmitting line and at least one second signal transmitting line both located in the non-display area; the first signal transmitting line extends from the bonding area towards a direction away from the bonding area; the second signal transmitting line is arranged on a side of the display area close to the bonding area; and at least one output adjustable circuit, the output adjustable circuit comprising an input end, a first output end, and a second output end, wherein the input end receives an initial voltage signal, the first output end is connected to the first signal transmitting line, and the second output end is connected to the second signal transmitting line; and the output adjustable circuit is configured to output a first voltage signal to the first signal transmitting line and output a second voltage signal to the second signal transmitting line according to the initial voltage signal;

wherein the initial voltage signal is a common voltage signal, and the first signal transmitting line and the second signal transmitting line are common voltage transmitting lines; any two of the input end, the first output end, and the second output end are open circuited or provided with a resistor with a corresponding resistance value.

The present application provides a display device, the display device comprises a first substrate and at least one output adjustable circuit. The first substrate comprises a display area and a non-display area arranged around the display area; the non-display area is provided with a bonding area; the first substrate comprises a first signal transmitting line and at least one second signal transmitting line both located in the non-display area; the first signal transmitting line extends from the bonding area towards a direction away from the bonding area; the second signal transmitting line is arranged on a side of the display area close to the bonding area. The output adjustable circuit comprises an input end, a first output end, and a second output end; the input end receives an initial voltage signal, the first output end is connected to the first signal transmitting line, and the second output end is connected to the second signal transmitting line. The present application sets the output adjustable circuit to output a first voltage signal to the first signal transmitting line and output a second voltage signal to the second signal transmitting line according to the initial voltage signal, so as to carry out optimized matching according to process uniformity and attenuation caused by loss differences in a signal transmission process, realize a uniform distribution of the initial voltage signal in each area of the display device, and improve a display effect. In addition, with regard to image sticking, H-crosstalk, and other display problems, the output adjustable circuit can also easily adjust a voltage of a certain area to meet distribution requirements of the initial voltage signal required to analyze specific display problems.

BRIEF DESCRIPTION OF DRAWINGS

Technical schemes and other beneficial effects of the present invention will be apparent through the detailed description of the specific embodiments of the present invention in combination with accompanying drawings.

DETAILED DESCRIPTION OF PREFERRED EMBODIMENTS

In the following, the technical scheme in the embodiment of the present application will be described clearly and completely in combination with the drawings. Obviously, the described embodiments are only a part of the embodiments of the present application, rather than all the embodiments. Based on the embodiments of the present application, all other embodiments obtained by those skilled in the art without creative work fall within the protection scope of the present application.

In the description of the present application, it should be understood that the terms "first" and "second" are only used for descriptive purposes and cannot be understood as indicating or implying relative importance or implicitly indicating the number of indicated technical features. Thus, the features defining "first" and "second" may explicitly or implicitly comprise one or more of the features. Therefore, it cannot be understood as a limitation on the present application.

In addition, it should be noted that unless otherwise specified and limited, the terms "connection" should be understood in a broad sense, for example, it can be mechanical connection or electrical connection; it can be directly connected or indirectly connected through an intermediate medium, and it can be the connection between two components. For those skilled in the art, the specific meaning of the above terms in the present invention can be understood in specific circumstances.

The present application provides a display device described in detail below. It should be noted that the order of description of the following embodiments does not limit the preferred order of the embodiments of the present application.

Figure 1:
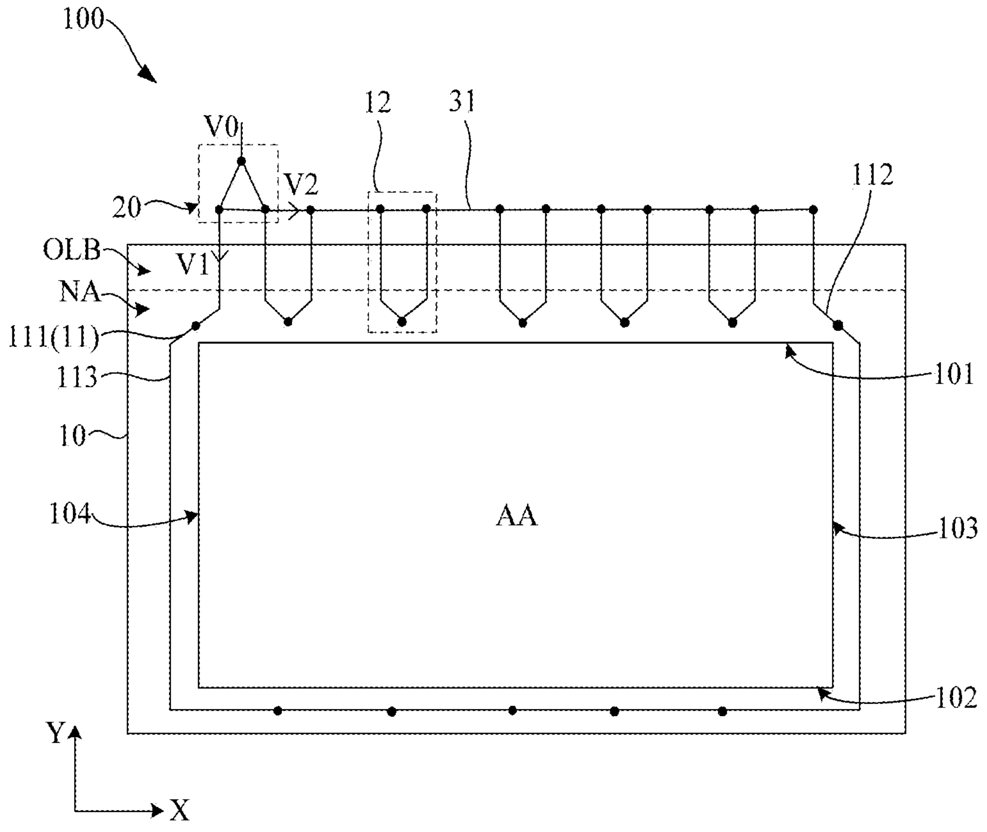
FIG. 1 is a first schematic structural diagram of a display device provided by the present application.
Figure 2:
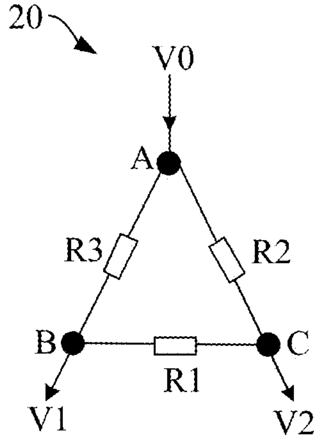
FIG. 2 is a schematic structural diagram of an output adjustable circuit provided by the present application.

Please refer to FIG. 1 and FIG. 2, FIG. 1 is a first schematic structural diagram of a display device provided by the present application; FIG. 2 is a schematic structural diagram of an output adjustable circuit provided by the present application. The embodiments of the present application provide a display device 100. The display device 100 comprises a first substrate 10 and an output adjustable circuit 20.

Wherein the first substrate 10 comprises a display area AA and a non-display area NA arranged around the display area AA. The non-display area NA is provided with a bonding area OLB. The first substrate 10 comprises a first signal transmitting line 11 and at least one second signal transmitting line 12. The first signal transmitting line 11 is located in the non-display area NA and extends from the bonding area OLB towards a direction away from the bonding area OLB. The second signal transmitting line 12 is located in the non-display area NA and is arranged on a side of the display area AA close to the bonding area OLB.

The output adjustable circuit 20 comprises an input end A, a first output end B, and a second output end C. The input end A is connected to an initial voltage signal V0. The first output end B is connected to the first signal transmitting line 11, and the second output end C is connected to the second signal transmitting line 12. The output adjustable circuit 20 is configured to output a first voltage signal V1 to the first signal transmitting line 11 and output a second voltage signal V2 to the second signal transmitting line 12 according to the initial voltage signal V0.

The embodiments of the present application set the output adjustable circuit 20 in the display device 100, the output adjustable circuit 20 can output the first voltage signal V1 to the first signal transmitting line 11 and output the second voltage signal V2 to the second signal transmitting line 12 according to the initial voltage signal V0. The output adjustable circuit 20 can carry out optimized matching according to process uniformity and attenuation caused by loss differences in a signal transmission process, and adjust voltage values of the first voltage signal V1 and the second voltage signal V2, respectively, and realize a uniform distribution of the initial voltage signal V0 in each area of the display device 100, so as to improve a display effect. In addition, with regard to image sticking, H-crosstalk, and other display problems, for a purpose of experimental verification, it is also convenient to adjust a voltage of a certain area by adjusting the voltage values of the first voltage signal V1 and the second voltage signal V2 to meet distribution requirements of the initial voltage signal required to analyze specific display problems.

In addition, in order to improve uniformity of the initial voltage signal V0 in the display device 100, it is usually possible to start from two aspects: improving process capacity and optimizing designs. However, to improve the process capability, there are many shortcomings, such as equipment needing to be upgraded, a long course, a limited degree of improvement, poor flexibility, and so on, which are not in line with current mainstream trends of cost reduction and efficiency increase. The embodiments of the present application are optimized from a design perspective. Based on the process capability of current project, the consistency of the voltage distribution of the initial voltage signal V0 in each area of the display device 100 can be achieved, and quality of optical performance can be improved.

In the embodiments of the present application, the display device 100 can be a thin film transistor liquid crystal display (TFT-LCD). The first substrate 10 can be an array substrate. A structure of the array substrate is a technology well known to those skilled in the art and will not be repeated here. Wherein the initial voltage signal V0 can be a common voltage signal, and the first signal transmitting line 11 and the second signal transmitting line 12 are both common voltage transmitting lines for transmitting common voltage signals. Understandably, with a continuous development of technology and panel industry, liquid crystal display devices with larger sizes and higher refresh rates are increasingly favored by consumers. In the liquid crystal display devices, liquid crystals can flip at different angles depending on different voltages of a pixel electrode and a common electrode at both ends of a liquid crystal capacitor. Wherein voltage uniformity of the common electrode will directly affect display quality of the liquid crystal display devices. At present, image sticking, H-crosstalk, mura, etc. commonly seen in a TFT-LCD are closely related to a voltage of the common electrode.

Of course, the initial voltage signal V0 in the embodiments of the present application is not limited to the common voltage signal. In the display device 100, any signal that needs to be transmitted from an area close to the bonding area OLB to an area away from the bonding area OLB can be the initial voltage signal V0 in the embodiments of the present application as long as there are differences between a near end and a far end caused by transmission losses, etc.

In the embodiments of the present application, the output adjustable circuit 20 can have different working modes according to actual requirements of the display device 100 for the first voltage signal V1 and the second voltage signal V2. That is, there can be different connection schemes between any two of the input end A, the first output end B, and the second output end C.

In the embodiments of the present application, voltage values of the first voltage signal V1 and the second voltage signal V2 can be adjusted by setting a voltage dividing circuit or other voltage regulating circuit in the output adjustable circuit 20.

Specifically, in some embodiments of the present application, any two of the input end A, the first output end B, and the second output end C of the output adjustable circuit 20 are open circuited or provided with a resistor with a corresponding resistance value.

It can be understood that an open circuit between any two of the input end A, the first output end B, and the second output end C is equivalent to an infinite resistance value between any two of the input end A, the first output end B, and the second output end C, which cannot be connected. For example, if there is an open circuit between the first output end B and the second output end C, it can be understood that a resistance value of a first resistor R1 arranged between the first output end B and the second output end C is infinite. It can also be understood that the first output end B and the second output end C are disconnected, and no connecting lines are arranged between the first output end B and the second output end C. FIG. 2 is only an example and cannot be understood as a limitation of the present application.

Figures 3, 4:
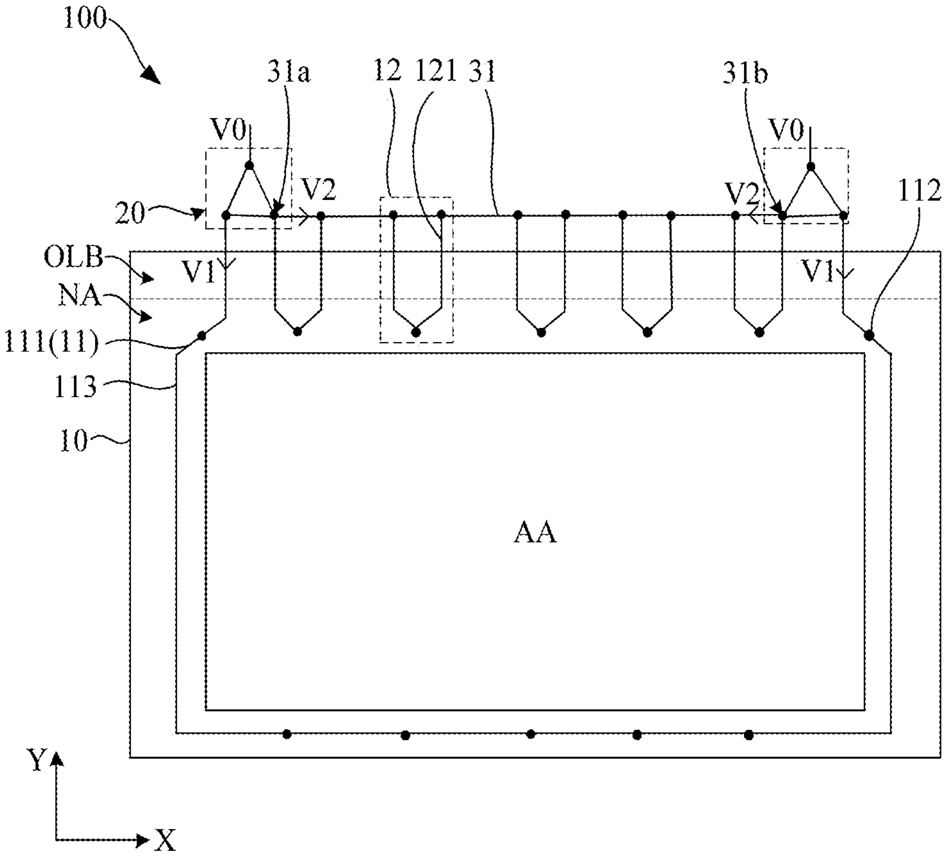
FIG. 3 is a schematic diagram of working modes of the output adjustable circuit provided by the present application.
FIG. 4 is a second schematic structural diagram of the display device provided by the present application.

Specifically, please refer to FIG. 2 and FIG. 3. FIG. 3 is a schematic diagram of working modes of the output adjustable circuit provided by the present application.

In some embodiments of the present application, as shown in connection scheme 1 in FIG. 3, there is an open circuit between the first output end B and the second output end C (in FIG. 3, a mark "x" indicates the open circuit on the circuit). A second resistor R2 is arranged between the input end A and the second output end C. A third resistor R3 is arranged between the input end A and the first output end B. Resistance values of the second resistor R2 and the third resistor R3 are zero.

Wherein the open circuit between the first output end B and the second output end C can be understood as disconnection between the first output end B and the second output end C, and the first resistor R1 is not arranged between the first output end B and the second output end C. It can also be understood that a resistance value of the first resistor R1 arranged between the input end A and the first output end B is infinite.

In the connection scheme of the embodiments of the present application, a voltage value of the initial voltage signal V0, a voltage value of the first voltage signal V1, and a voltage value of the second voltage signal V2 are equal. The connection scheme is consistent to a traditional design scheme. In an ideal state, that is, without considering a signal transmission loss, the connection scheme can be adopted.

In some embodiments of the present application, as shown in connection scheme 2 in FIG. 3, the first resistor R1 is arranged between the first output end B and the second output end C. The third resistor R3 is arranged between the input end A and the first output end B. There is an open circuit between the input end A and the second output end C. The resistance value of the first resistor R1 is greater than zero. The resistance value of the third resistor R3 is zero.

Wherein the open circuit between the input end A and the second output end C can be understood as disconnection between the input end A and the second output end C, and the second resistor R2 is not arranged between the input end A and the second output end C. It can also be understood that the resistance value of the second resistor R2 arranged between the input end A and the second output end C is infinite.

In the connection scheme of the embodiments of the present application, since the resistance value of the third resistor R3 is zero, the voltage value of the first voltage signal V1 is equal to the voltage value of the initial voltage signal V0. Since the resistance value of the first resistor R1 is greater than zero, the voltage value of the second voltage signal V2 is less than the voltage value of the initial voltage signal V0 after a voltage of the first resistor R1 is divided. That is, the voltage value of the first voltage signal V1 is greater than the voltage value of the second voltage signal V2.

It can be understood that since the first signal transmitting line 11 extends from the bonding area OLB to the direction away from the bonding area OLB, the second signal transmitting line 12 is arranged on the side of the display area AA close to the bonding area OLB. In an area away from the bonding area OLB, signal loss generated by the first signal transmitting line 11 is relatively large, and the initial voltage signal V0 will become smaller in an area away from the bonding area OLB after it is actually input to a plane. The embodiments of the present application make the voltage value of the first voltage signal V1 greater than the voltage value of the second voltage signal V2 by the output adjustable circuit 20, that is, an input voltage of the second signal transmitting line 12 is less than an input voltage of the first signal transmitting line 11. Combining capacitance resistance load (RC loading) generated by the first signal transmitting line 11, and finally reducing a voltage difference of the initial voltage signal V0 between the area away from the bonding area OLB and the area close to the bonding area OLB in the display device 100, the uniform distribution of the initial voltage signal V0 in each area of the display device 100 can be achieved.

In some embodiments of the present application, as shown in connection scheme 3 in FIG. 3, the first resistor R1 is arranged between the first output end B and the second output end C. The second resistor R2 is arranged between the input end A and the second output end C. There is an open circuit between the input end A and the first output end B. The resistance value of the second resistor R2 is zero. The resistance value of the first resistor R1 is greater than zero.

Wherein the open circuit between the input end A and the first output end B can be understood as disconnection between the input end A and the first output end B, and the third resistor R3 is not arranged between the input end A and the first output end B. It can also be understood that the resistance value of the third resistor R3 arranged between the input end A and the first output end B is infinite.

In the connection scheme of the embodiments of the present application, since the resistance value of the second resistor R2 is zero, the voltage value of the second voltage signal V2 is equal to the voltage value of the initial voltage signal V0. Since the resistance value of the first resistor R1 is greater than zero, the voltage value of the first voltage signal V1 is less than the voltage value of the initial voltage signal V0 after the voltage of the first resistor R1 is divided. That is, the voltage value of the first voltage signal V1 is less than the voltage value of the second voltage signal V2.

Similarly, since the first signal transmitting line 11 extends from the bonding area OLB to the direction away from the bonding area OLB, the second signal transmitting line 12 is arranged on the side of the display area AA close to the bonding area OLB. In an area away from the bonding area OLB, the signal loss generated by the first signal transmitting line 11 is relatively large. The embodiments of the present application make the voltage value of the first voltage signal V1 less than the voltage value of the second voltage signal V2 by the output adjustable circuit 20, that is, an input voltage of the second signal transmitting line 12 is higher than an input voltage of the first signal transmitting line 11. In combination with RC loading of the first signal transmitting line 11, finally, a voltage difference of the initial voltage signal V0 between the area away from the bonding area OLB and the area close to the OLB in the display device 100 is made larger. In this case, by adjusting the resistance value of the first resistor R1, the voltage values of the first voltage signal V1 and the second voltage signal V2 can be adjusted, so that it is convenient to adjust a voltage of a certain area and realize a voltage distribution required to analyze specific display problems such as image sticking, H-crosstalk, etc.

In some embodiments of the present application, as shown in connection scheme 4 in FIG. 3, there is an open circuit between the first output end B and the second output end C. The second resistor R2 is arranged between the input end A and the second output end C. The third resistor R3 is arranged between the input end A and the first output end B. The resistance values of the second resistor R2 and the third resistor R3 are both greater than zero.

In the connection scheme of the embodiments of the present application, since resistance values of the second resistor R2 and the third resistor R3 are greater than zero, the voltage value of the initial voltage signal V0 is greater than the voltage value of the first voltage signal V1, and the voltage value of the initial voltage signal V0 is greater than a voltage value of the second voltage signal V2. The embodiments of the present application make the initial voltage signal V0 not equal to an area away from the bonding area OLB and an area close to the OLB in the display device 100.

Wherein the resistance value of the second resistor R2 and the resistance value of the third resistor R3 can be equal or may not be equal, which can be selected according to requirements of the display device 100.

In the embodiments of the present application, the display device 100 further comprises a connecting line 31. The display device 100 comprises a plurality of second signal transmitting lines 12.

Wherein the connecting line 31 extends along a first direction X. The plurality of second signal transmitting lines 12 are spaced along the first direction X and extend to an outside of the first substrate 10 along a second direction Y. Ends of the plurality of second signal transmitting lines 12 away from the bonding area OLB are connected together through the connecting line 31. An end of the connecting line 31 is connected to the second output end C. The first direction X intersects with the second direction Y.

Wherein the first direction X and the second direction Y can be crossed vertically, or they can only be crossed and not vertical according to a structural design of the display device 100 or due to process error, which is not specifically limited in the application.

It can be understood that the initial voltage signal V0 is transmitted to different areas of the first substrate 10 through the first signal transmitting line 11 and the second signal transmitting line 12. Since the bonding area OLB needs to bond driver chips (not shown in the figures), one second signal transmitting line 12 can only extend a certain length along the first direction X. That is, one second signal transmitting line 12 cannot transmit the initial voltage signal V0 to an entire area of the display area AA near the bonding area OLB.

In this regard, the embodiments of the present application can transmit the second voltage signal V2 to each of the second signal transmitting lines 12 through the connecting line 31 by arranging the plurality of second signal transmitting lines 12 spaced along the first direction X and connecting the plurality of second signal transmitting lines 12 together through the connecting line 31.

It should be noted that in the embodiments of the present application, the second output end C of the output adjustable circuit 20 is directly connected with the end of the connecting line 31. That is, the second output end C is connected to the second signal transmitting lines 12 through the connecting line 31.

Please refer to FIG. 2 and FIG. 4, FIG. 4 is a second schematic structural diagram of the display device provided by the present application. A difference from the display device 100 shown in FIG. 1 is that in the embodiments of the present application, the display device comprises two output adjustable circuits 20.

Specifically, the display area AA has a first side 101 and a second side 102 arranged opposite to each other, and a third side 103 and a fourth side 104 arranged opposite to each other. The bonding area OLB is located at the first side 101. The first signal transmitting line 11 is arranged at least along the third side 103, the second side 102, and the fourth side 104.

Wherein along the first direction X, the connecting line 31 comprises a first end 31*a* and a second end 31*b* arranged corresponding to each other. One of the two output adjustable circuits 20 is connected with the first end 31*a* and an end of the first signal transmitting line 11 close to the first end 31*a*, respectively. That is, the first output end B of the one of the two output adjustable circuits 20 is connected to the first signal transmitting line 11, and the second output end C is connected to the first end 31*a*. Another one of the two output adjustable circuits 20 is connected with the second end 31*b* and an end of the first signal transmitting line 11 close to the second end 31*b*, respectively. That is, the first output end B of the another one of the two output adjustable circuits 20 is connected with the first signal transmitting line 11, and the second output end C is connected with the second end 31*b*.

It can be understood that since the first signal transmitting line 11 is arranged at least along the third side 103, the second side 102, and the fourth side 104, a thread of the first signal transmitting line 11 is long and signal transmission loss is large. Therefore, in the embodiments of the present application, one output adjustable circuit 20 is arranged at both ends of the first signal transmitting line 11, respectively, which can further improve the distribution uniformity of the initial voltage signal V0 on the first signal transmitting line 11.

In the embodiments of the present application, connection schemes of the two output adjustable circuits 20 can be same or can be different. When the two output adjustable circuits 20 adopt a same connection scheme, a resistance value of each resistor in the two output adjustable circuits 20 can be correspondingly the same or can also be different. Specifically, it can be arranged according to requirements of the display device 100 to further improve flexibility of the voltage distribution of the initial voltage signal V0 in different areas of the display device 100.

In the embodiments of the present application, the first signal transmitting line 11 can comprise a first line segment 111, a second line segment 112, and a third line segment 113 connecting the first line segment 111 and the second line segment 112. The first line segment 111 and the second line segment 112 are located on the side of the display area AA close to the bonding area OLB. The third line segment 113 is arranged along the third side 103, the second side 102, and the fourth side 104.

Wherein a resistance value of the first line segment 111 is greater than a resistance value of at least one of the second signal transmitting lines 12 arranged close to the first line segment 111. A resistance value of the second line segment 112 is greater than a resistance value of at least one of the second signal transmitting lines 12 arranged close to the second line segment 112.

For example, along the first direction X, a resistance value of a first second signal transmitting line 12 arranged close to the first line segment 111 is less than the resistance value of the first line segment 111. Alternatively, along the first direction X, resistance values of the first second signal transmitting line 12 and a second signal transmitting line 12 arranged close to the first line segment 111 are both less than the resistance value of the first line segment 111. Along the first direction X, a resistance value of a first second signal transmitting line 12 arranged close to the second line segment 112 is less than the resistance value of the second line segment 112. Alternatively, along the first direction X, resistance values of the first second signal transmitting line 12 and a second signal transmitting line 12 arranged close to the second line segment 112 are both less than the resistance value of the second line segment 112.

It can be understood that in order to improve the distribution uniformity of the initial voltage signal V0 in each area of the display device 100, in one of the connection schemes of the output adjustable circuit 20, the voltage value of the first voltage signal V1 is greater than that of the second voltage signal V2. However, since threads of the first line segment 111 and at least one of the second signal transmitting lines 12 arranged close to the first line segment 111 are almost same, and the resistance values of the first line segment 111 and at least one of the second signal transmitting lines 12 arranged close to the first line segment 111 are almost same, voltage distribution of the initial voltage signal V0 on the first line segment 111 and on at least one of the second signal transmitting lines 12 arranged close to the first line segment 111 will be different. Similarly, voltage distribution of the initial voltage signal V0 on the second line segment 112 and on at least one of the second signal transmitting lines 12 arranged close to the second line segment 112 will be different.

The embodiments of the present application can further improve the distribution uniformity of the initial voltage signal V0 in each area of the display device 100 by arranging the resistance value of the first line segment 111 to be greater than the resistance value of the at least one of the second signal transmitting lines 12 arranged close to the first line segment 111, and arranging the resistance value of the second line segment 112 to be greater than the resistance value of the at least one of the second signal transmitting lines 12 arranged close to the second line segment 112.

It should be noted that in other connection schemes of the output adjustable circuit 20, the scheme of the embodiments of the present application is also applicable, and only the resistance value of each resistor in the output adjustable circuit 20 needs to be further adjusted.

Specifically, in the embodiments of the present application, the at least one of the second signal transmitting lines 12 arranged close to the first line segment 111 comprises at least two sub-transmitting lines 121 arranged in parallel. Thus, the resistance value of the second signal transmitting line 12 arranged close to the first line segment 111 is reduced. Similarly, the at least one of the second signal transmitting lines 12 arranged close to the second line segment 112 comprises at least two sub-transmitting lines 121 arranged in parallel. Thus, the resistance value of the second signal transmitting line 12 arranged close to the second line segment 112 is reduced.

Figure 5:
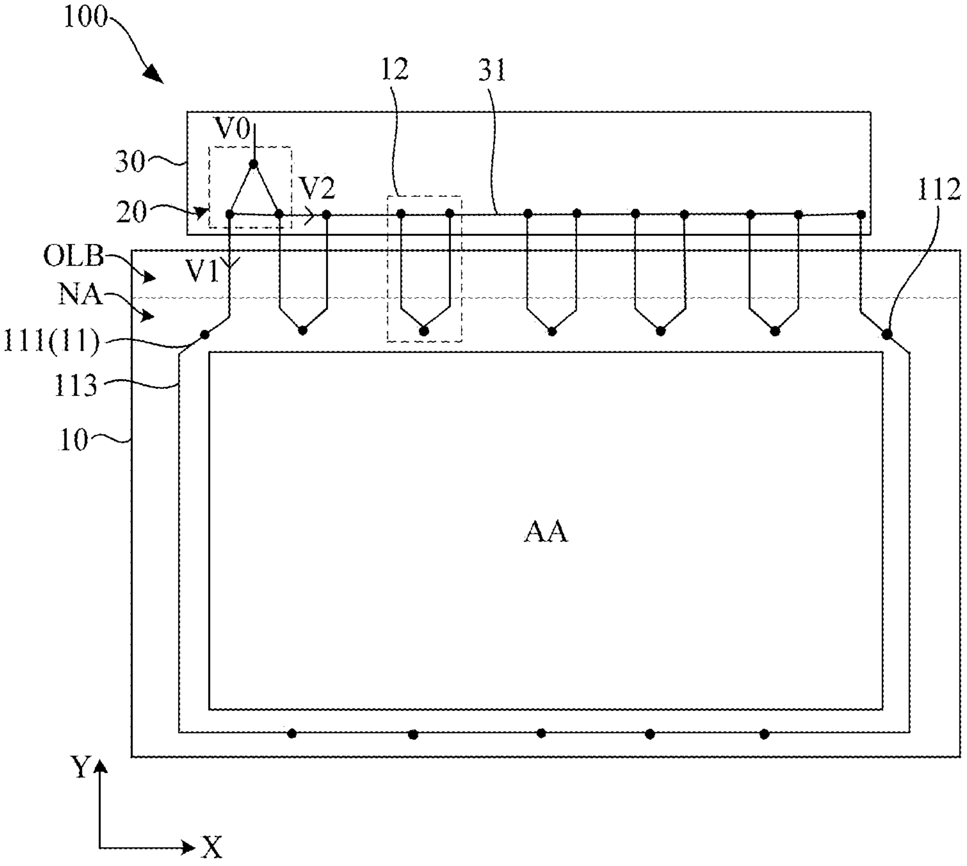
FIG. 5 is a third schematic structural diagram of the display device provided by the present application.

Please refer to FIG. 2 and FIG. 5, FIG. 5 is a third schematic structural diagram of the display device provided by the present application. A difference from the display device 100 shown in FIG. 1 is that in the embodiments of the present application, the display device 100 further comprises a circuit board 30. The circuit board 30 is connected to the bonding area OLB, and the output adjustable circuit 20 and the connecting line 31 are arranged on the circuit board 30.

Wherein the bonding area OLB can bond at least one chip on film (COF), and the circuit board 30 is bonded with the first substrate 10 through the COF. The circuit board 30 can be provided with a timing control chip, a power management integrated chip, etc. The circuit board 30 is used to transmit the initial voltage signal V0 to the first substrate 10.

It can be understood that when the output adjustable circuit 20 is arranged on the circuit board 30, and while the circuit board 30 is manufactured, Optimized matching can be carried out according to process uniformity of the display device 100 and attenuation caused by loss differences in a signal transmission process, and appropriate resistors are selected to solder between each two of the input end A, the first output end B, and the second output end C. After the circuit board 30 is manufactured, resistance value of each resistor can also be adjusted by replacing the resistor in the circuit board 30. The operation is very convenient and simple.

Of course, in other embodiments of the present application, the output adjustable circuit 20 and the connecting line 31 can also be arranged in other structures of the display device 100, as long as the initial voltage signal V0 at near and far ends of the bonding area OLB can be adjusted.

Figure 6:
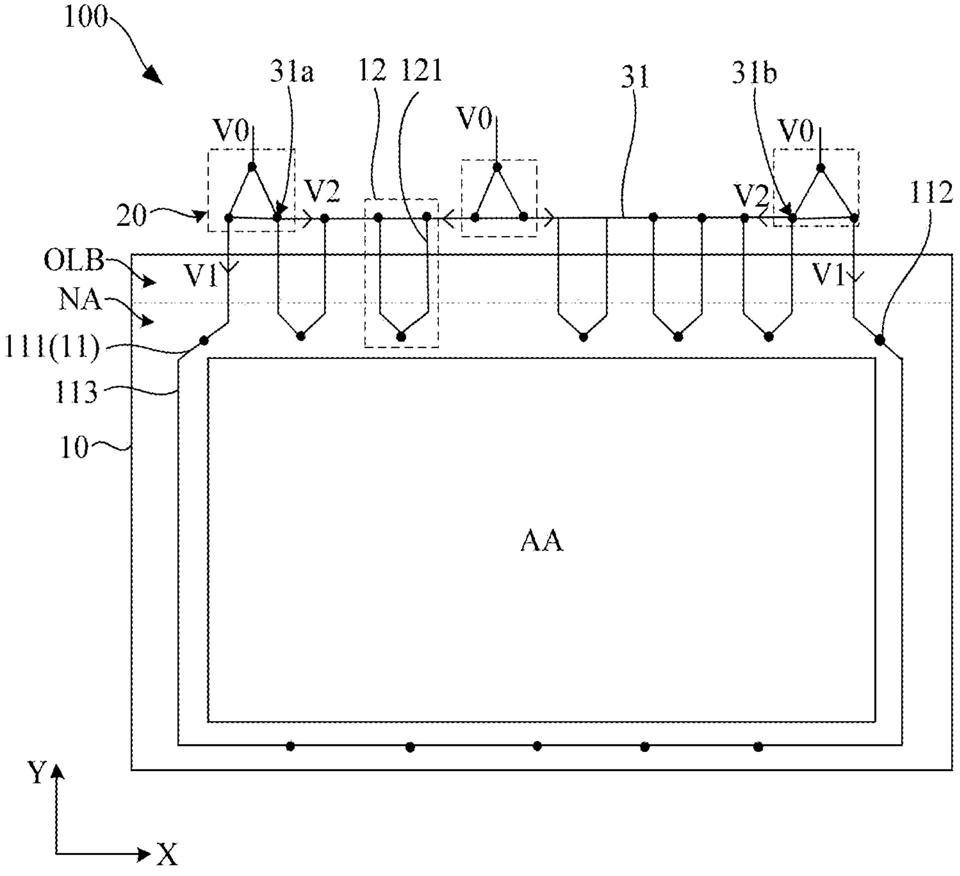
FIG. 6 is a fourth schematic structural diagram of the display device provided by the present application.

Please refer to FIG. 2 and FIG. 6, FIG. 6 is a fourth schematic structural diagram of the display device provided by the present application. A difference from the display device 100 shown in FIG. 4 is that in the embodiments of the present application, the display device 100 comprises three output adjustable circuits 20. Only three output adjustable circuits 20 are shown in FIG. 6, but they cannot be understood as limitation to the application.

Specifically, compared with the display device 100 shown in FIG. 4, except for the two output adjustable circuits 20 respectively arranged at the first end 31*a* and the second end 31*b* of the connecting line 31, a remaining output adjustable circuits 20 is arranged between the first end 31*a* and the second end 31*b* of the connecting line 31. The first output end B and the second output end C of the output adjustable circuit 20 arranged between the first end 31*a* and the second end 31*b* are connected to the connecting line 31.

It can be understood that when a size of the display device 100 is large, a thread of the connecting line 31 extending along the first direction X is long, and there is also a certain signal transmission loss, resulting in uneven distribution of the second voltage signal V2 on the connecting line 31. The embodiments of the present application can further improve the distribution uniformity of the initial voltage signal V0 by adding at least one output adjustable circuit 20 between the first end 31*a* and the second end 31*b*.

In the embodiments of the present application, the connection scheme of the output adjustable circuit 20 located between the first end 31*a* and the second end 31*b* can be set according to the requirements of the display device 100.

Figure 7:
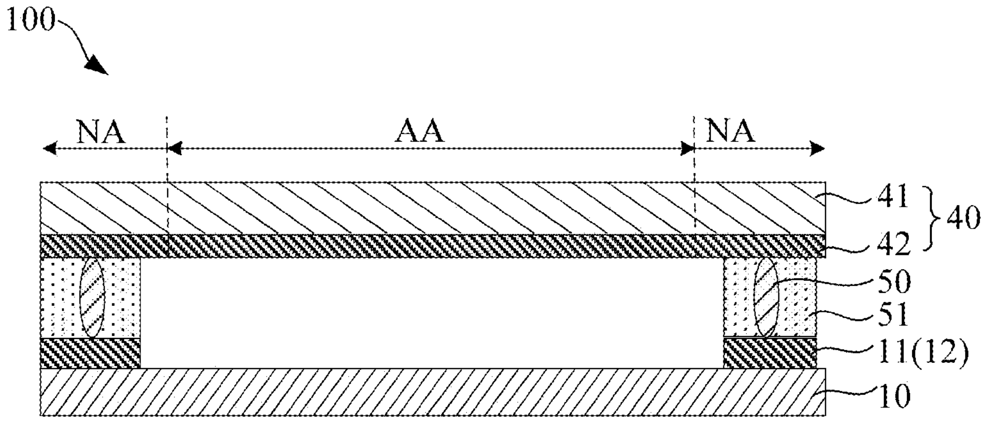
FIG. 7 is a sectional structural diagram of the display device provided by the present application.

Please refer to FIG. 2 and FIG. 7. FIG. 7 is a sectional structural diagram of the display device provided by the present application. In the embodiments of the present application, the initial voltage signal V0 is a common voltage signal. The display device 100 also comprises a second substrate 40 and a conductor 50. The second substrate 40 is arranged opposite to the first substrate 10. The conductor 50 is arranged between the first substrate 10 and the second substrate 40 and is located in the non-display area NA. Liquid crystals (not shown in the figure) are filled between the first substrate 10 and the second substrate 40. A sealant 51 is arranged in the non-display area NA to seal the liquid crystals. The conductor 50 is distributed in the sealant 51.

Wherein the second substrate 40 comprises a substrate 41 and a common electrode 42. An entire surface of the common electrode 42 can be arranged on a side of the substrate 41 close to the first substrate 10. The common electrode 42 is connected with the first signal transmitting line 11 and the second signal transmitting line 12 through the conductor 50.

Wherein the first substrate 10 is an array substrate. The second substrate 40 is a color film substrate. A common voltage signal of the common electrode 42 needs to be obtained from the first signal transmitting line 11 and the second signal transmitting line 12 through the conductor 50. The conductor 50 can be a golden ball.

In the embodiments of the present application, since the output adjustable circuit 20 improves the distribution uniformity of the initial voltage signal V0 on the first signal transmitting line 11 and the second signal transmitting line 12, voltage uniformity received by the common electrode 42 can be improved and the display effect of the display device 100 can be improved.

The display device is described in detail above. And in this paper, specific examples are applied to explain the principle and implementation mode of the application. The above embodiments are only examples of the implementation of the present invention. Those of ordinary skill in the art should understand that they can still modify the technical scheme recorded in the above embodiments, or equivalent replace some of the technical features. These modifications or substitutions do not separate the essence of the corresponding technical scheme from the scope of the technical scheme of each embodiment of the present invention.

What is claimed is:

1. A display device, comprising:

a first substrate, the first substrate comprising a display area and a non-display area arranged around the display area, wherein the non-display area is provided with a bonding area, and the first substrate comprises a first signal transmitting line and at least one second signal transmitting line both located in the non-display area; the first signal transmitting line extends from the bonding area towards a direction away from the bonding area; the second signal transmitting line is arranged on a side of the display area close to the bonding area; and at least one output adjustable circuit, the output adjustable circuit comprising an input end, a first output end, and a second output end, wherein the input end receives an initial voltage signal, the first output end is connected to the first signal transmitting line, and the second output end is connected to the second signal transmitting line; the output adjustable circuit is configured to output a first voltage signal and a second voltage signal; and the first voltage signal is transferred from the first output end to the first signal transmitting line and the second voltage signal is transferred from the second output end to the second signal transmitting line.

2. The display device according to claim 1, wherein any two of the input end, the first output end, and the second output end are open circuited or provided with a resistor with a corresponding resistance value.

3. The display device according to claim 2, wherein a first resistor is arranged between the first output end and the second output end, a second resistor is arranged between the input end and the second output end, and the input end and the first output end are open circuited; a resistance value of the second resistor is zero, and a resistance value of the first resistor is greater than zero.

4. The display device according to claim 2, wherein a first resistor is arranged between the first output end and the second output end, a third resistor is arranged between the input end and the first output end, and the input end and the second output end are open circuited; a resistance value of the first resistor is greater than zero, and a resistance value of the third resistor is zero.

5. The display device according to claim 2, wherein the first output end and the second output end are open circuited, a second resistor is arranged between the input end and the second output end, a third resistor is arranged between the input end and the first output end, and resistance values of the second resistor and the third resistor are both greater than zero.

6. The display device according to claim 2, wherein the display device further comprises a connecting line, and the display device comprises a plurality of second signal transmitting lines; and wherein the connecting line extends along a first direction, and the plurality of second signal transmitting lines are spaced along the first direction and extend to an outside of the first substrate along a second direction; an end of each of the second signal transmitting lines away from the bonding area is connected to the connecting line, an end of the connecting line is connected to the second output end, and the first direction intersects with the second direction.

7. The display device according to claim 6, wherein the display area comprises a first side and a second side arranged opposite to each other, and a third side and a fourth side arranged opposite to each other, the bonding area is located at the first side, and the first signal transmitting line is arranged at least along the third side, the second side, and the fourth side; and wherein along the first direction, the connecting line comprises a first end and a second end arranged opposite to each other, the display device comprises two output adjustable circuits, and one of the two output adjustable circuits is connected to the first end and an end of the first signal transmitting line close to the first end, respectively; another one of the two output adjustable circuits is connected to the second end and an end of the first signal transmitting line close to the second end, respectively.

8. The display device according to claim 7, wherein the first signal transmitting line comprises a first line segment, a second line segment, and a third line segment connecting the first line segment and the second line segment; the first line segment and the second line segment are both located on the side of the display area close to the bonding area, and the third line segment is arranged along the third side, the second side, and the fourth side; and wherein a resistance value of the first line segment is greater than a resistance value of at least one of the second signal transmitting lines arranged close to the first line segment, and a resistance value of the second line segment is greater than a resistance value of at least one of the second signal transmitting lines arranged close to the second line segment.

9. The display device according to claim 7, wherein one of the second signal transmitting lines arranged close to a first line segment comprises at least two sub-transmitting lines arranged in parallel.

10. The display device according to claim 6, wherein the display device comprises three output adjustable circuits, and a first one of the three output adjustable circuits is connected to the first end and the end of the first signal transmitting line close to the first end, respectively; a second one of the three output adjustable circuits is connected to the second end and the end of the first signal transmitting line close to the second end, respectively; and a third one of the three output adjustable circuits is arranged between the first end and the second end.

11. The display device according to claim 6, wherein the display device further comprises a circuit board, the circuit board is connected to the bonding area, and the output adjustable circuit and the connecting line are both arranged on the circuit board.

12. The display device according to claim 1, wherein the initial voltage signal is a common voltage signal, and the first signal transmitting line and the second signal transmitting line are both common voltage transmitting lines.

13. The display device according to claim 12, wherein the display device further comprises a circuit board, the circuit board is connected to the bonding area, and the output adjustable circuit is arranged on the circuit board.

14. The display device according to claim 1, wherein the display device further comprises a second substrate and a conductor, the second substrate is arranged opposite to the first substrate, and the conductor is arranged between the first substrate and the second substrate and is located in the non-display area; and wherein the second substrate comprises a common electrode, and the common electrode is connected to the first signal transmitting line and the second signal transmitting line through the conductor.

15. A display device, comprising:

a first substrate, the first substrate comprising a display area and a non-display area arranged around the display area, wherein the non-display area is provided with a bonding area, and the first substrate comprises a first signal transmitting line and at least one second signal transmitting line both located in the non-display area; the first signal transmitting line extends from the bonding area towards a direction away from the bonding area; the second signal transmitting line is arranged on a side of the display area close to the bonding area; and at least one output adjustable circuit, the output adjustable circuit comprising an input end, a first output end, and a second output end, wherein the input end receives an initial voltage signal, the first output end is connected to the first signal transmitting line, and the second output end is connected to the second signal transmitting line; and the output adjustable circuit is configured to output a first voltage signal to the first signal transmitting line and output a second voltage signal to the second signal transmitting line according to the initial voltage signal;

wherein the initial voltage signal is a common voltage signal, and the first signal transmitting line and the second signal transmitting line are common voltage transmitting lines.

16. The display device according to claim 15, wherein a first resistor is arranged between the first output end and the second output end, a second resistor is arranged between the input end and the second output end, and the input end and the first output end are open circuited; a resistance value of the second resistor is zero, and a resistance value of the first resistor is greater than zero.

17. The display device according to claim 15, wherein a first resistor is arranged between the first output end and the second output end, a third resistor is arranged between the input end and the first output end, and the input end and the second output end are open circuited; a resistance value of the first resistor is greater than zero, and a resistance value of the third resistor is zero.

18. The display device according to claim 15, wherein the first output end and the second output end are open circuited, a second resistor is arranged between the input end and the second output end, a third resistor is arranged between the input end and the first output end, and resistance values of the second resistor and the third resistor are both greater than zero.

19. The display device according to claim 15, wherein the display device further comprises a connecting line, and the display device comprises a plurality of second signal transmitting lines; and wherein the connecting line extends along a first direction, and the plurality of second signal transmitting lines are spaced along the first direction and extend to an outside of the first substrate along a second direction; an end of each of the second signal transmitting lines away from the bonding area is connected to the connecting line, an end of the connecting line is connected to the second output end, and the first direction intersects with the second direction.

20. The display device according to claim 15, wherein the display device further comprises a circuit board, the circuit board is connected to the bonding area, and the output adjustable circuit and the connecting line are both arranged on the circuit board.

* * * * *